United States Statutory Invention Registration [19]

[11] Reg. Number: H530

Woods [43] Published: Oct. 4, 1988

[54] METHOD AND APPARATUS FOR STAKING OPTICAL ELEMENTS

[75] Inventor: Robert O. Woods, Albuquerque, N. Mex.

[73] Assignee: The United States of America as represented by the United States Department of Energy, Washington, D.C.

[21] Appl. No.: 160,213

[22] Filed: Feb. 25, 1988

[51] Int. Cl.[4] ..... G02B 7/18

[52] U.S. Cl. ..... 350/631

*Primary Examiner*—Stephen C. Buczinski
*Assistant Examiner*—Linda J. Wallace
*Attorney, Agent, or Firm*—Anne Daniel; James H. Chafin; Judson R. Hightower

[57] ABSTRACT

A method and apparatus for staking two optical elements together in order to retain their alignment is disclosed. The apparatus includes a removable adaptor made up of first and second adaptor bodies each having a lateral slot in their front and side faces. The adaptor also includes a system for releasably attaching each adaptor body to a respective optical element such that when the two optical elements are positioned relative to one another the adaptor bodies are adjacent and the lateral slots therein are aligned to form key slots. The adaptor includes keys which are adapted to fit into the key slots. A curable filler material is employed to retain the keys in the key slots and thereby join the first and second adaptor bodies to form the adaptor. Also disclosed is a method for staking together two optical elements employing the adaptor of the present invention.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

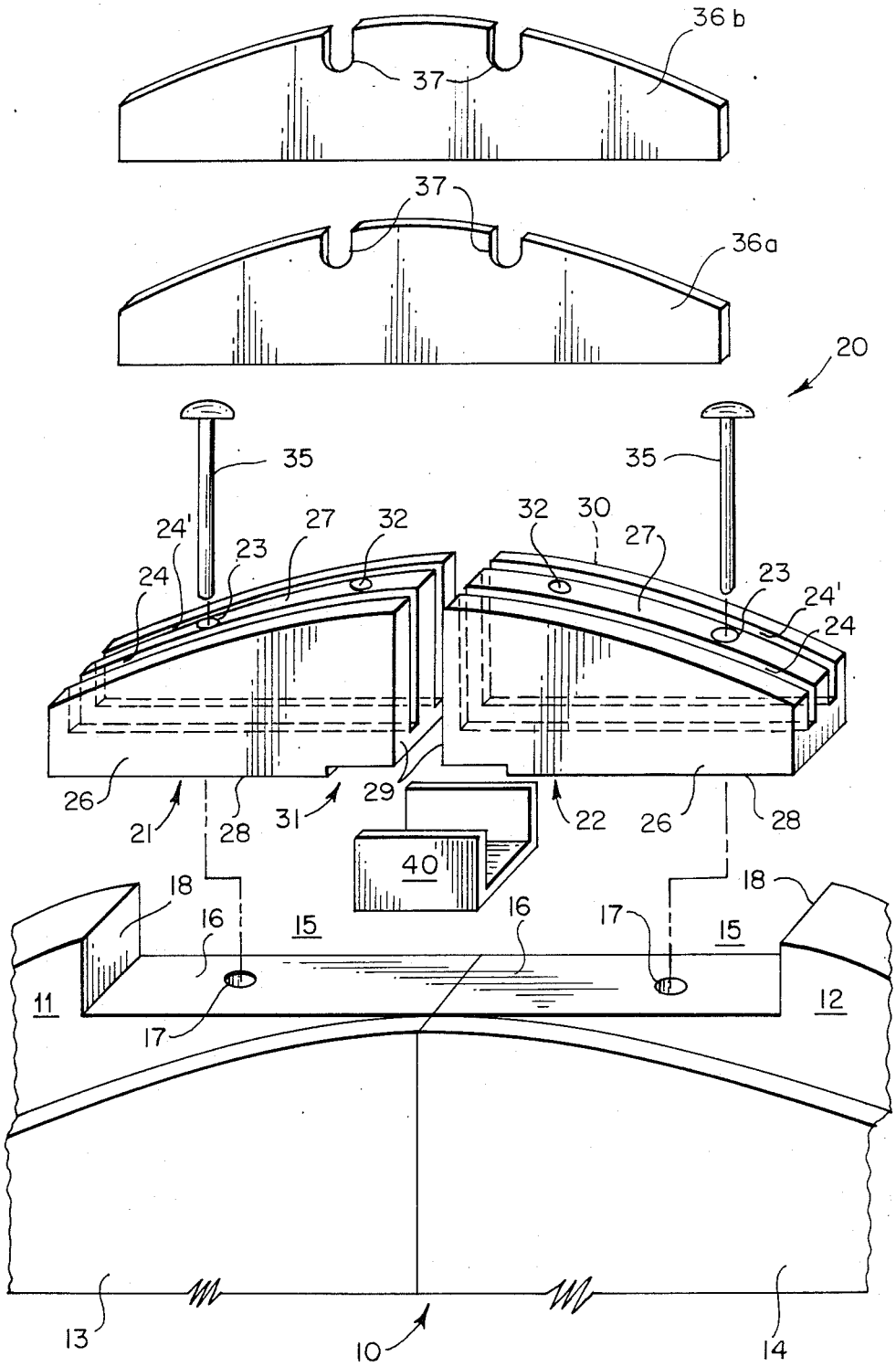
36 b
37
37
36a
20
35
35
24'
24
23
27
32
32
30
27
23
24'
24
26
21
28
31
29
22
26
28
40
18
16
15
16
17
15
18
11
12
17
13
10
14

METHOD AND APPARATUS FOR STAKING OPTICAL ELEMENTS

The U.S. Government has rights in this invention pursuant to Contract DE-AC04-76DP00789 between the U.S. Department of Energy and AT&T Technologies, Inc.

BACKGROUND OF THE INVENTION

The present invention relates to a method and apparatus for staking together two optical elements in order to retain their alignment.

Many optical systems are fabricated in several pieces and must be assembled prior to use. In addition, these optical systems often involve two or more components which must be aligned to within a fraction of a wavelength of light. This alignment must be maintained during and after assembly of the optical components.

An example of such an optical system is a satellite-borne optical system which involves the use of a metal Vee mirror. This Vee mirror is fabricated in several pieces and, after being aligned to within a fraction of a wavelength of light, must be staked so as to retain the alignment during launch by a rocket. It is also necessary that it be possible to disassemble the optical system without damaging the individual optical components in the event that testing or handling requires disassembly.

U.S. Pat. No. 3,684,380 (Benchley, Jr.) issued on Aug. 15, 1972 discloses a navigational aid comprising two mirrors held at right angles to each other. Benchley suggests attaching the mirrors to a member which is locked to a stud with a threaded rod. This alignment means is not designed to withstand the forces of the launch of a rocket nor is the alignment absolutely critical since the user can adjust his position to correct for deficiencies of alignments. Further, this mirror assembly is designed to be pivotable to two planes to compensate for rough sea conditions.

U.S. Pat. No. 3,832,040 (Ciabrini) issued on Aug. 27, 1974 discloses an optical component mount which utilizes a plurality of thin elastic strips distributed at equal intervals about a universal ball-joint centered on the axis of the optical component. This arrangement is designed to limit the stress placed on the optical component by the mounting means. The elasticity of the flat beams reduces the radial forces at the points of connection to the optical or other element. However, certain radial forces will still exist because of the variance within the dimensional tolerances of fabricated parts.

U.S. Pat. No. 4,037,944 (Hanson) issued on July 26, 1977 discloses a low stress optical mounting structure and method. A mounting bore is formed to loosely receive a mounting post. Lateral bores intersect the mounting bore at right angles and filler material is deposited between the mounting bore and the mounting post extending into the lateral bores. This method is not satisfactory for a number of reasons. Chiefly, the fact that alignments depends upon the compressive strength of a relatively large thickness and small area of adhesive is unsatisfactory. Further, the staking material is not prevented from wicking into the contact areas between optical components. This can perturb the alignment when the adhesive material expands upon curing. Also, this joint cannot be disassembled without subjecting the optical components to disruptive forces. Finally, differential expansion of the adhesive material during setting will cause displacement of the optical components since a pin in a cylindrical bore will be displaced radially unless it is perfectly centered. This would be a significant problem in a highly asymmetric arrangement.

SUMMARY OF THE INVENTION

The present invention relates to a removable adaptor for use in staking together two optical elements without perturbing optical alignment. The removable adaptor is made up of first and second adaptor bodies each having a front face, a rear face, a side face, and at least one lateral slot in the front and side faces. The adaptor also includes a means for releasably attaching the first adaptor body to a first optical element and the second adaptor body to a second optical element such that when the first and second optical elements are positioned relative to one another the first adaptor body is adjacent the second adaptor body and the lateral slot in the first adaptor body is aligned with the lateral slot in the second adaptor body to form at least a single key slot. The adaptor also includes at least one key which is adapted to fit into the key slot and a means for retaining the key in the key slot without perturbing the optical alignment to thereby attach the first adaptor body to the second adaptor body.

The present invention also relates to a method of removably staking optical elements without perturbing optical alignment. The first step of the method is to releasably attach first and second adaptor bodies each having a rear face, a front face, a side face, and at least one lateral slot which extends into the front and side faces, to first and second optical elements respectively. Then, the first and second optical elements are aligned to within a fraction of a wavelength of light and such that the first and second adaptor bodies are adjacent and the lateral slot in the first adaptor body is aligned with the lateral slot in the second adaptor body to form a key slot. Next, a key is inserted into the key slot and the space between the key and the walls of the key slot is filled with a curable adhesive filler material which is allowed to cure to thereby stake the two optical elements together.

It is the primary object of the present invention to provide a method and apparatus for staking together two optical elements without perturbing optical alignment.

It is another object of the present invention to provide a method and apparatus for staking together two optical elements which allows disassembly of the optical elements without subjecting either optical element to disruptive forces.

It is a further object of the present invention to provide a method and apparatus for staking together two optical elements which minimizes the displacement of the optical elements during curing of the filler material caused by differential expansion of the filler material or by uneven distribution of the filler material in the space being filled.

It is a still further object of the present invention to provide a method and apparatus for staking together two optical elements which will withstand the force of a rocket launch without disturbing the alignment of the optical elements.

It is a still further object of the present invention to provide a method and apparatus for staking together two optical elements which employs curable adhesive filler material in its most effective manner.

These and other objects of the present invention will be apparent to one of ordinary skill in the art from the detailed description which follows.

BRIEF DESCRIPTION OF THE DRAWING

The single FIGURE is a perspective view of the preferred embodiment of the removable adaptor of the present invention in disassembled form.

DETAILED DESCRIPTION OF THE PREFERRED EMBODIMENT

Referring to the FIGURE, there is shown a top view of part of a Vee mirror assembly 10 inlcuding a first mirror body 11 and a second mirror body 12 which are not physically attached to one another. First mirror body 11 has a first mirror 13 attached at a 45° angle thereto. Second mirror body 12 has a second mirror 14 attached at a 45° angle thereto. Each of first and second mirror bodies 11 and 12 include an adaptor recess 15 therein. Adaptor recesses 15 are defined by an inner wall 16 and a side wall 18. Each inner wall 16 includes a bore 17 therein. Bores 17 are typically used to attach an adaptor to the Vee mirror assembly 10.

A removable adaptor 20 includes a first adaptor body 21 and a second adaptor body 22. In the preferred embodiment, each of adaptor bodies 21 and 22 are interchangeable but they need not be to accomplish the purpose of the invention. Thus, adaptor bodies 21 and 22 include a top 26, a bottom 30, a front face 27, a rear face 28 and a side face 29. Front face 27 of each of adaptor bodies 21 and 22 has a bore 23 located therein. Each of bores 23 extend all the way through adaptor bodies 21 and 22 to rear face 28. Also in front face 27 of each of adaptor bodies 21 and 22 is a threaded hole 32 which extends all the way through adaptor bodies 21 and 22 to rear face 28. Front face 27 and side face 29 of each of adaptor bodies 21 and 22 respectively include two lateral slots 24, 24' therein. Rear faces 28 of adaptor bodies 21 and 22 have a foil recess 31 therein.

Also part of the adaptor 20 are keys **36*a* and 36*b*. Each key 36*a* and 36*b* includes two cavities 37** therein.

To stake together Vee mirror assembly 10 first adaptor body 21 is pinned to first mirror body 11 by aligning bore 23 in first adaptor body 21 with bore 17 in first mirror body 11 and inserting pin 35 through bore 23 and into bore 17 to pin first adaptor body 21 to first mirror body 11. Bores 17 and 23 are of the same or smaller diameter than pin 35 such that a tight fit between pin 35 and both bores 17, 23 is effected to retain pin 35 in both bores 17, 23 and thereby retain first adaptor body 21 in connection with first mirror body 11 with no possibility of relative motion between the two. Second adaptor body 22 is then attached to second mirror body 12 in exactly the same manner as first adaptor body 21 was attached to first mirror body 11. At this point there is no physical connection between first mirror body 11 and second mirror body 12, or between first adaptor body 21 and second adaptor body 22. Respective lateral slot 24 and 24' in first adaptor body 21 are aligned with respective lateral slots 24 and 24' in second adaptor body 22 such that respective lateral slots 24 and 24' form two key slots into which keys **36*a* and 36*b*** will be inserted.

The next step in the staking process is to insert keys **36*a* and 36*b* into the key slots formed by lateral slots 24 and 24'. The key slots are slightly larger than keys 36*a* and 36*b* to provide clearance between keys 36*a* and 36*b* and the key slots. At this point Vee mirror assembly 10 is tilted such that keys 36*a* and 36*b* are vertical and cavities 37 are on top, and a foil 40 is inserted through foil recess 31 and wrapped around top 26 and bottom (not shown) of adaptor bodies 21 and 22 to enclose the crack between side faces 29 of adaptor bodies 21 and 22. The presence of the foil prevents wicking of curable filler material into the area between adaptor bodies 21 and 22 and Vee mirror assembly 10, as well as the area between first mirror assembly 11 and second mirror assembly 12. Further, surfaces 29 of adaptor bodies 21 and 22** are designed so as to be separated by a gap large enough to avoid wicking of the adhesive filler into the volume between them.

The final step in staking Vee mirror assembly 10 together is to fill cavities 37 with a curable adhesive filler material and then allow the curable material to fill the residual space between keys **36*a* and 36*b* and the key slots as a result of gravity and capillary action. Cavities 37 are dimensioned so as to accept the correct volume of adhesive filler. The curable filler material is then allowed to cure and foil 40 is then removed from foil recess 31. The adhesive attachment between keys 36*a* and 36*b* in adaptor bodies 21 and 22 provide a physical connection between adaptor bodies 21 and 22. This, in turn, stakes first mirror body 11 to second mirror body 12 since each of adaptor bodies 21 and 22 are attached to mirror bodies 11 and 12 respectively. In order to remove adaptor 20 from Vee mirror assembly 10, jacking screws (not shown) are inserted into threaded holes 32 and screwed into adaptor 20 until they impinge on inner wall 16 of Vee mirror assembly 10. The jacking screws are then screwed further to thereby separate adaptor 20 from inner wall 16 until pins 35 are pulled from bores 17 and adaptor 20 is free from Vee mirror assembly 10**.

Adaptor 20 is preferably disposable. It may be made from metal or other suitable material which is capable of being fabricated in the desired shape and capable of withstanding the forces adaptor 20 is subjected to during use. Keys **36*a* and 36*b* are also preferably disposable and may be made from metal or other suitable material which is capable of withstanding the forces keys 36*a* and 36*b*** will be subjected to during use.

Pins 35 are also preferably disposable and made from a material, preferably metal, having shear strength and modulus adequate to sustain the applied loads with a tolerable amount of deformation. They are dimensioned such that they may be forced into undersized holes 17 to thereby create a rigid connection between adaptor 20 and Vee mirror assembly 10.

The curable adhesive filler material must be in liquid form and preferably cures at room temperature. Furthermore, it is desirable to employ a curable material which does not exhibit significant differential expansion during curing. The adhesive filler material must have the property of adhering well to whatever material parts **21, 22, 36*a*, 36*b***, are made of.

Adaptor 20 of the present invention allows assembly of two optical elements without the danger of disturbing mechanical alignment between the elements. In addition, it allows disassembly of the optical elements without damage to the optical components and reassembly without further machining.

The arrangement also has the advantage of utilizing the curable adhesive filler material in its most effective manner. A large area comprising both surfaces of each key **36*a* and 36*b* is adhered by the curable adhesive filler material. Also, a small thickness, namely, the region between keys 36a and 36b and key slots formed by lateral slots 24 and 24' is filled with the curable filler material thus minimizing shear deflection. Any expansion of the curable filler material does not significantly displace keys 36a and 36b** because the volumes in which differential expansion takes place are juxtaposed so as to cause the expansions to cancel each other.

Another advantage of the present adaptor is that differential expansion of the filler material, or uneven distribution of the filler material will not significantly displace the aligned optical elements. This is because the adaptor 20 is relatively insensitive to differential expansion or uneven distribution of the curable filler material since keys 36a and 36b can only be displaced at right angles to the dimension that is being held constant as a result of filter material expansion. Thus, the optical alignment will be maintained even though keys 36a and 36b may be slightly displaced since they will not be displaced in the direction of the dimension being held constant. Further, any displacement that does occur is very small because of the symmetry of adaptor 20, However, even if displacement was relatively large it would not significantly disturb the precision of optical alignment.

Another significant advantage of adaptor 20 of the present invention is that it employs the curable filler material in shear rather than in compression or tension. Accordingly, alignment does not depend upon the compressive strength of a relatively large thickness and small area of curable filler material as it does in the prior art. Moreover, the curable filler material is most effective when acting in shear due to the relatively thin layer in which deflection can take place.

Finally, adaptor 20 of the present invention can be assembled without allowing the curable filler material to wick into interstices such as the surfaces between mirror bodies 11 an 12 to thereby separate mirror bodies 11 and 12 and disturb optical alignment. Wicking is a significant problem when attempting to retain alignment within dimensions on the order of a wavelength of light. Wicking is prevented in the present invention by the insertion of foil 40 into foil recess 31 prior to the introduction of a curable filler material to cavities 37. The foil remains in place until the curable filler material has completely cured and there is no danger of wicking. Then, the foil can be easily and quickly removed from the assembly since it is no longer necessary. Surfaces 29 are intentionally separated by a gap large enough to avoid wicking of the adhesive filler material into the volume between them.

Although the present invention has been described with respect to a single and exemplary embodiment thereof, it will be understood by those of ordinary skill in the art that variations and modifications can be effected within the scope and spirit of the invention. The scope of the invention is to be defined by the claims appended hereto.

What is claimed is:

1. A removable adaptor for use in staking together two optical elements without perturbing optical alignment comprising:

first and second adaptor bodies having a front face, a rear face, a side face and at least one lateral slot which extends into said front and side faces;

a means for releasably attaching said first adaptor body to a first optical element, a means for releasably attaching said second adaptor body to a second optical element such that when the first and second optical elements are positioned relative to one another said first adaptor body is adjacent to said second adaptor body and said at least one lateral slot in said first adaptor body is aligned with said at least one lateral slot in said second adaptor body to form at least one key slot;

at least one key adapted to fit into said at least one key slot; and a means for retaining said at least one key in said at least one key slot without perturbing optical alignment to thereby attach said first adaptor body to said second adaptor body.

2. A removable adaptor as claimed in claim 1 wherein said means for retaining said at least one key in said at least one key slot comprises a curable adhesive filler material.

3. A removable adaptor as claimed in claim 2 wherein said at least one key comprises at least one cavity located such that when said at least one key is inserted into said at least one key slot, said curable filler material may be introduced into said at least one cavity from said front faces of said adaptor bodies and said cavity meters the proper amount of adhesive filler material.

4. A removable adaptor as claimed in claim 3 wherein said curable filler material fills the region between said at least one key and the walls of said at least one key slot.

5. A removable adaptor as claimed in claim 4 wherein each of said first and second adaptor bodies further comprise at least one tapped hole running from said front face of each of said first and second adaptor bodies through said rear face of each of said first and second adaptor bodies.

6. A removable adaptor as claimed in claim 5 wherein each of said first and second adaptor bodies further comprises a recess in said back face adjacent said side face such that when said first and second adaptor bodies are adjacent one another, a unitary recess is formed in the adaptor.

7. A removable adaptor as claimed in claim 6 wherein said means for releasably attaching said first and second adaptor bodies to the first and second optical elements comprises:

at least one bore in each of said first and second adaptor bodies running from said front face through said rear face of each of said first and second adaptor bodies, and at least two pins longer than said at least two bores to be inserted through respective ones of said at least two bores and into respective ones of the first and second optical elements.

8. A removable adaptor as claimed in claim 7 wherein each of said first and second adaptor bodies comprise two lateral slots and the adaptor comprises two keys.

9. A removable adaptor as claimed in claim 8 wherein said keys comprise two cavities.

10. A method of removably staking optical elements without perturbing optical alignment comprising:

releasably attaching first and second adaptor bodies each having a rear face, a front face, a side face and at least one lateral slot which extends into said front and side faces to first and second optical elements respectively;

aligning the first and second optical elements to within a fraction of a wavelength of light and such that the first and second adaptor bodies are adjacent and the at least one lateral slot in the first adaptor body is aligned with said at least one lateral slot in the second adaptor body to form at least one key slot;

inserting at least one key into the at least one key slot;

filling the space between the at least one key and the walls of the at least one key slot with an adhesive curable filler material; and curing the filler material.

11. A method in accordance with claim 10 wherein the at least one key comprises at least two cavities located such that when the at least one key is inserted into the at least one key slot the curable filler material may be introduced into the at least two cavities from the front faces of the adaptor bodies, and said filling step comprises:

filling the at least two cavities with a sufficient amount of the filler material to fill the region between the at least one key and the walls of the at least one key slot in said adaptor bodies; and allowing the filler material to be drawn into the region between the at least one key and the walls of said at least one key slot in said adaptor bodies.

* * * * *